US008570536B2

(12) United States Patent  
Kelly

(10) Patent No.: US 8,570,536 B2  
(45) Date of Patent: Oct. 29, 2013

(54) SMART CRIMP TOOL SYSTEM FOR ELECTRICAL CONTACTS AND TERMINALS WHICH ARE CONTROLLED AND MONITORED BY A CENTRAL DATABASE MANAGER

(75) Inventor: William D. Kelly, Orlando, FL (US)

(73) Assignee: Daniels Manufacturing Corporation, Orlando, FL (US)

( * ) Notice: Subject to any disclaimer, the term of this patent is extended or adjusted under 35 U.S.C. 154(b) by 0 days.

(21) Appl. No.: 13/488,612

(22) Filed: Jun. 5, 2012

(65) Prior Publication Data

US 2012/0314226 A1 Dec. 13, 2012

Related U.S. Application Data

(60) Provisional application No. 61/494,551, filed on Jun. 8, 2011.

(51) Int. Cl.  
*G01B 11/14* (2006.01)

(52) U.S. Cl.  
CPC ..................................... *G01B 11/14* (2013.01)  
USPC ........................................ 356/625; 356/614

(58) Field of Classification Search  
CPC ........................................................ G01B 11/14  
USPC .................................................. 356/614–625  
See application file for complete search history.

(56) References Cited

U.S. PATENT DOCUMENTS

| 4,636,847 | A | * | 1/1987 | Magi et al. ..................... 382/141 |
| 5,841,675 | A | | 11/1998 | Ngo |
| 6,418,769 | B1 | | 7/2002 | Schreiner |
| 6,606,891 | B1 | | 8/2003 | McGowan |
| 2002/0036770 | A1 | * | 3/2002 | Maeda ........................ 356/237.1 |
| 2013/0044333 | A1 | * | 2/2013 | Onuma ........................... 356/614 |

* cited by examiner

*Primary Examiner* — Michael P Stafira  
(74) *Attorney, Agent, or Firm* — James H. Beusse; Beusse Wolter Sanks Mora & Maire, P.A.

(57) ABSTRACT

A crimp tool for crimping contacts onto wire cable ends includes an indentor mechanism having a plurality of moveable indentors for deforming a portion of a contact inserted into the mechanism. One of the indentors has a pressure responsive element for providing a signal indicative of the pressure exerted on the contact by the indentor. A device coupled to the pressure responsive element records pressure data and transfers data to an electronic control unit for determining operation of the mechanism. An automated inspection system uses light projection and a light sensor adapted for detecting light projected through a crimping die to measure dimensions and configurations of the crimping die. The system stores data representative of desired measurements of the crimping die and compares actual measurements to desired measurements. A set of fixtures are used for positioning the crimping die in the inspection system.

2 Claims, 16 Drawing Sheets

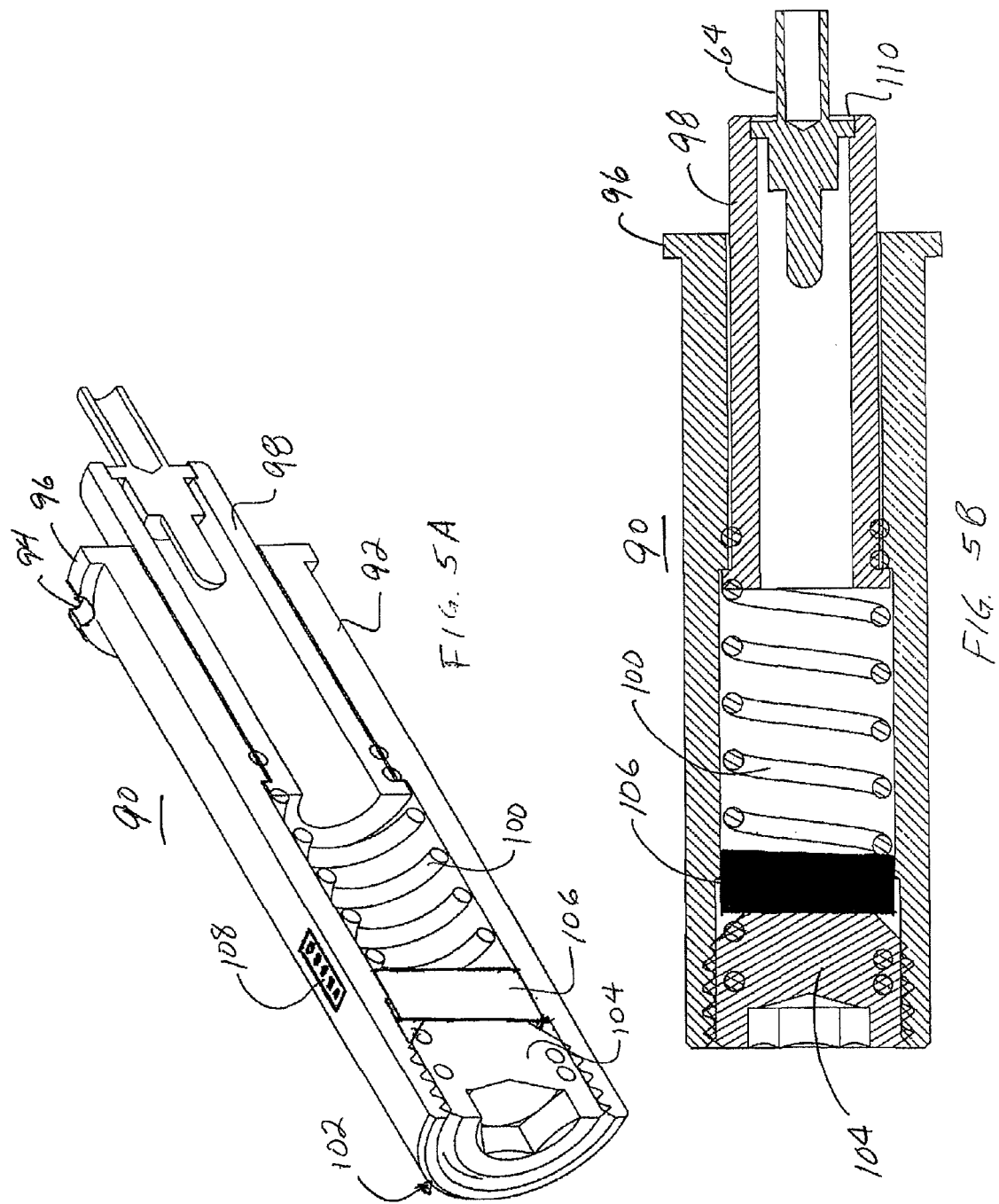

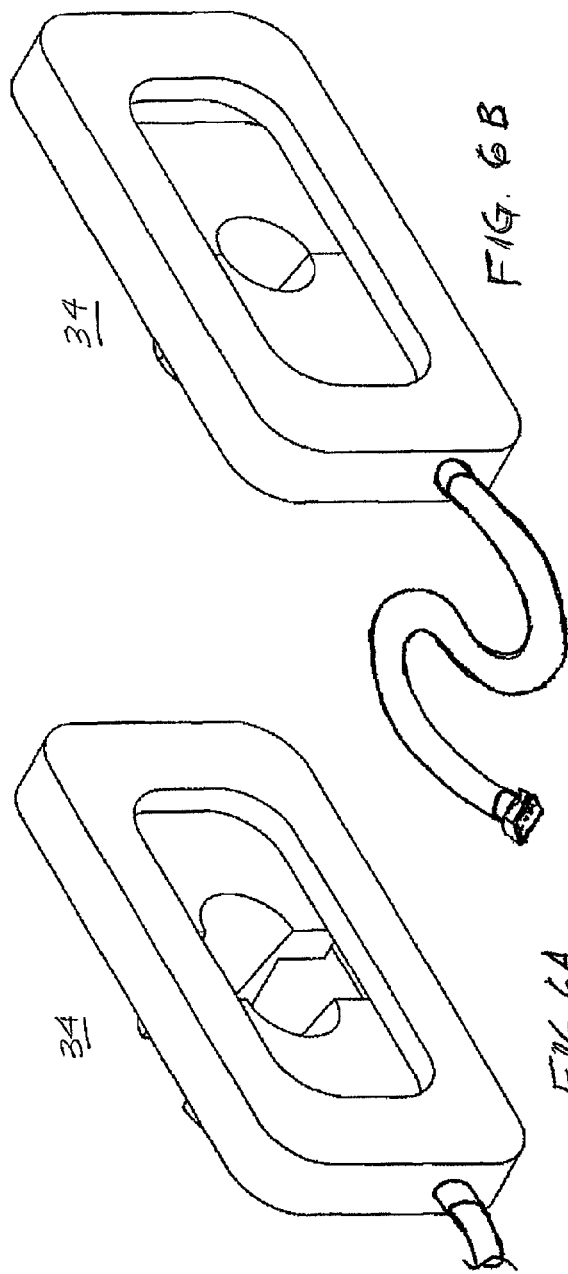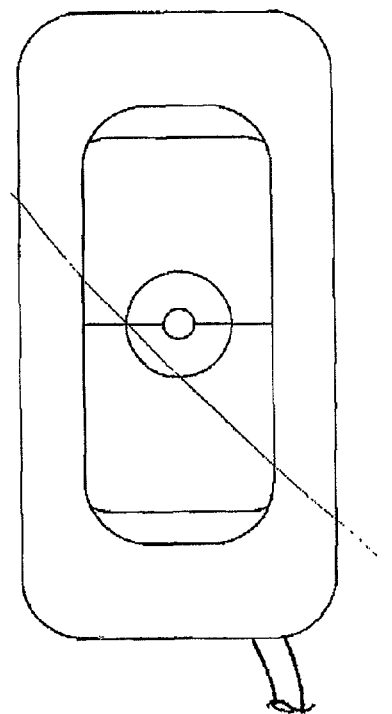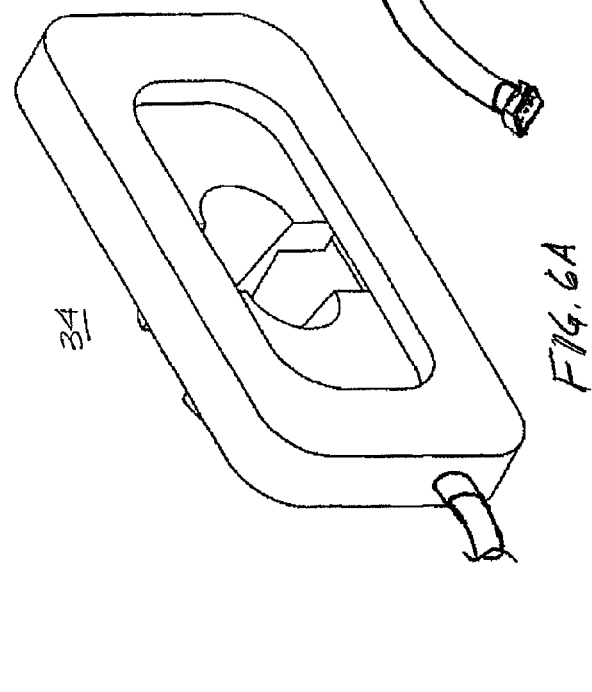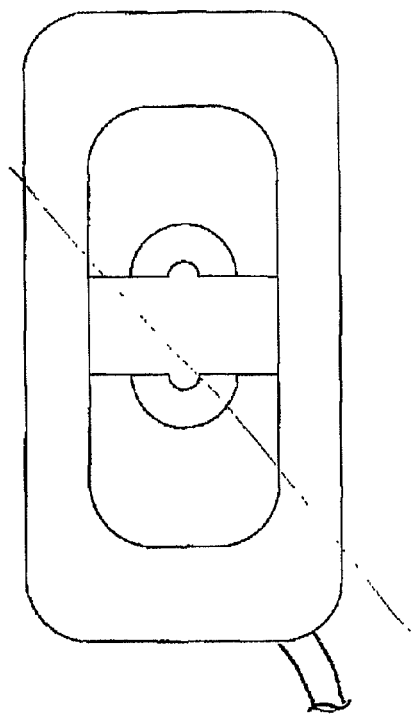

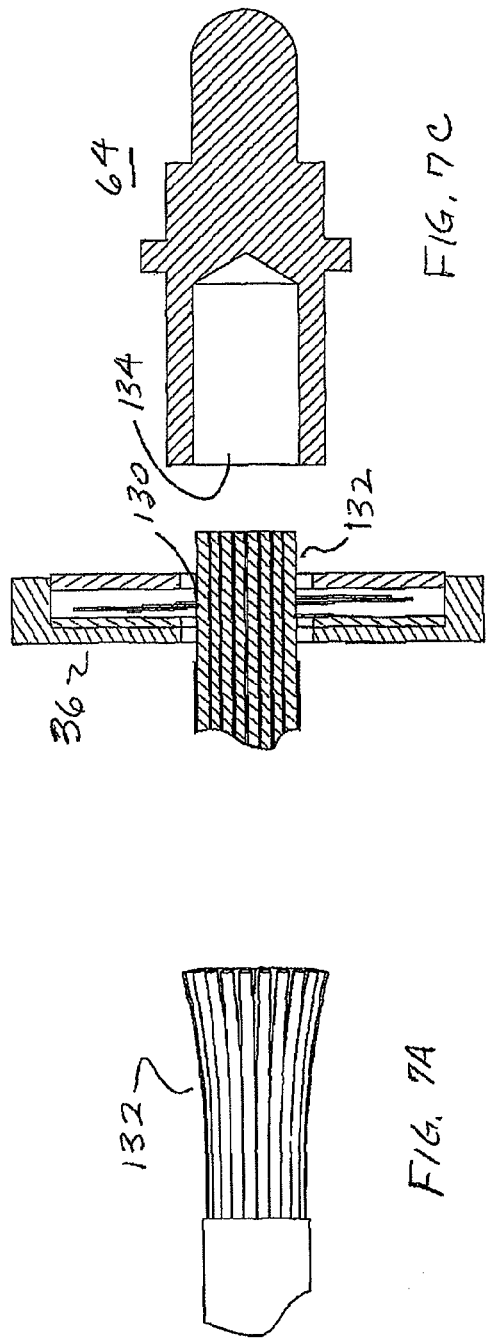
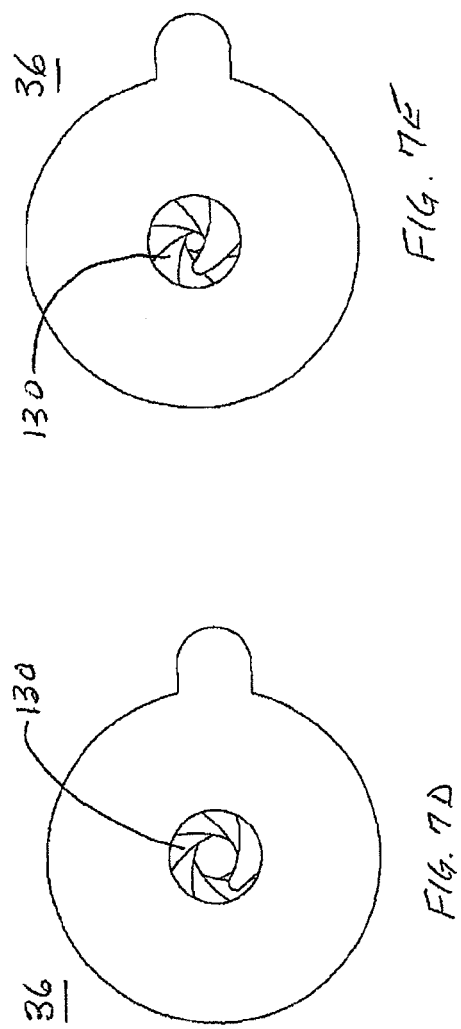

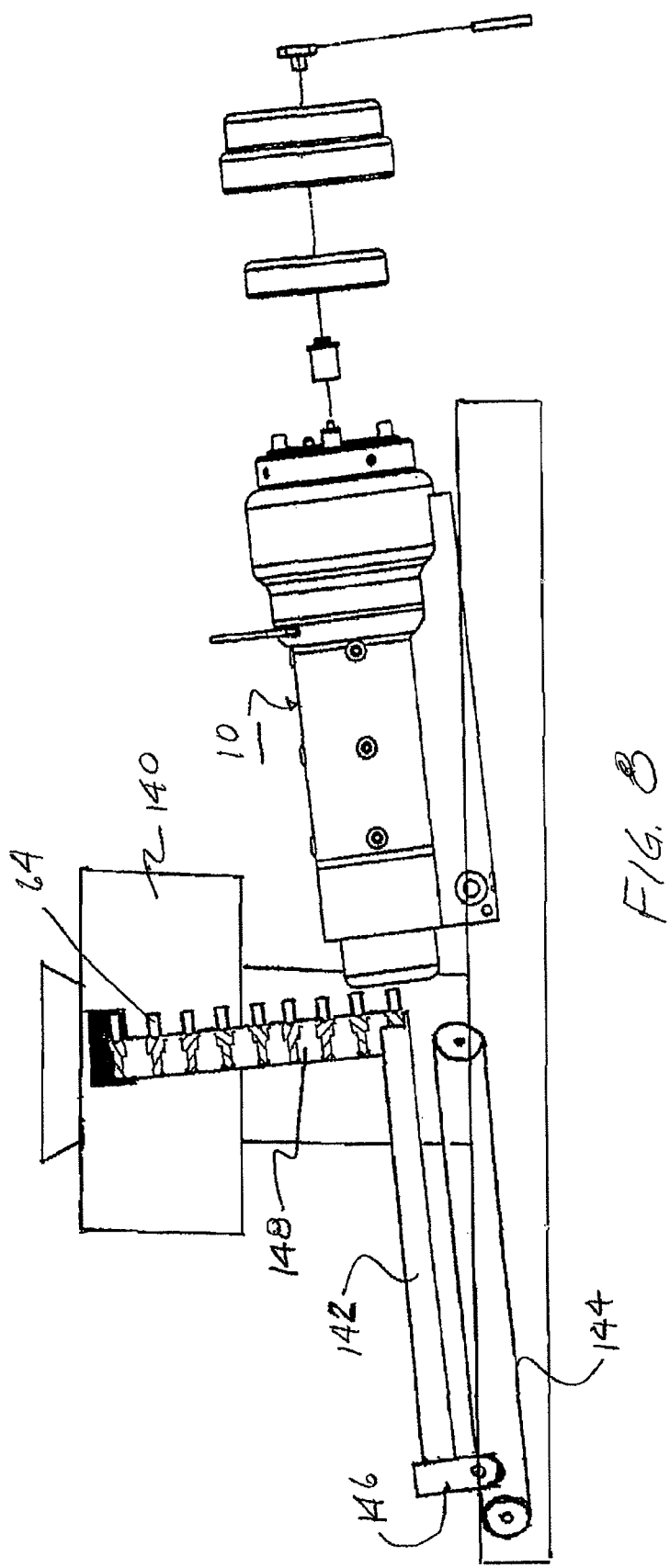

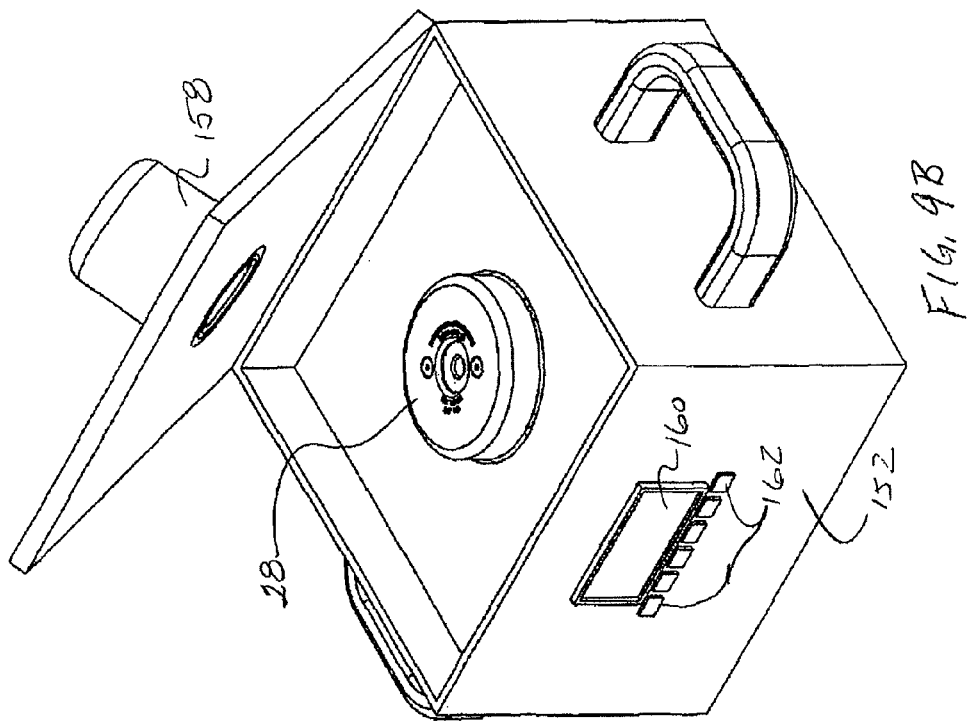
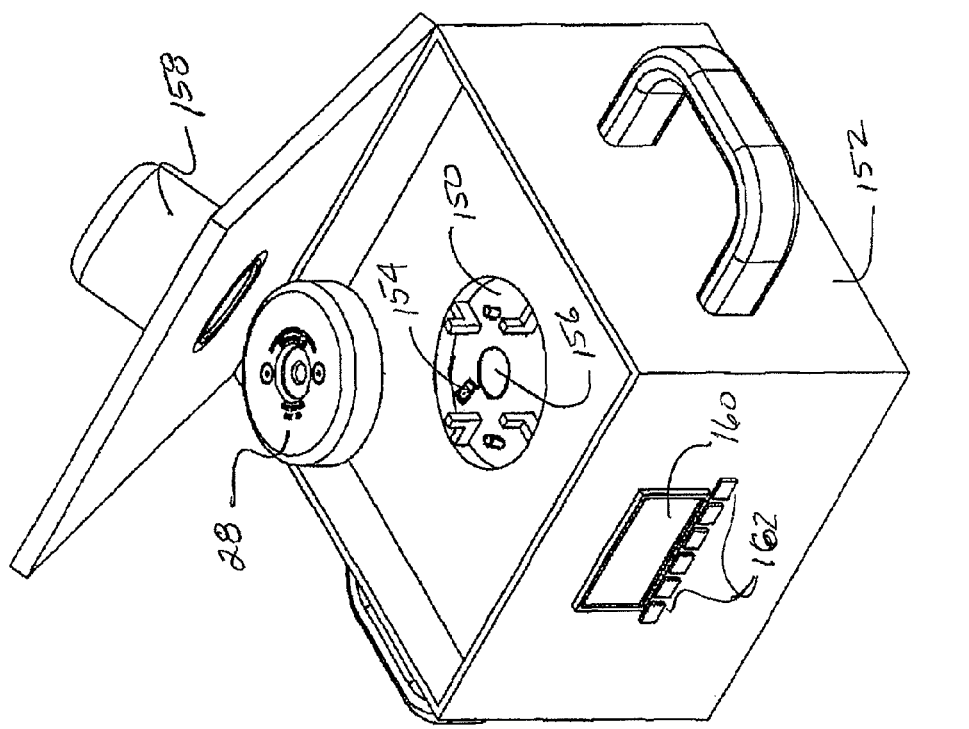

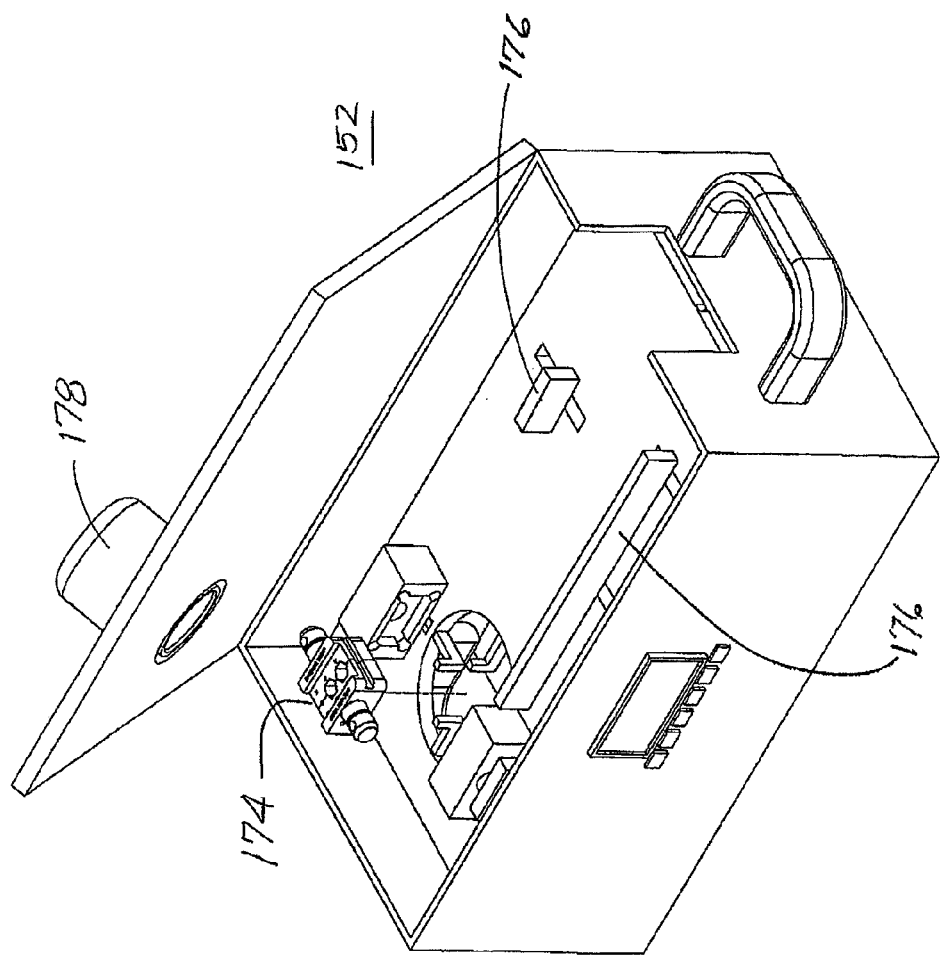

SMART CRIMP TOOL SYSTEM FOR ELECTRICAL CONTACTS AND TERMINALS WHICH ARE CONTROLLED AND MONITORED BY A CENTRAL DATABASE MANAGER

CROSS-REFERENCE TO RELATED APPLICATIONS

This application claims priority to U.S. Provisional Application No. 61/494,551 filed Jun. 8, 2011, which is incorporated herein by reference.

BACKGROUND OF THE INVENTION

Common tools for performing controlled crimp terminations on electrical contacts, terminals, and similar terminations in production wire harness operations are mechanical, and require external, periodic Go-No/Go gauging to verify the calibration is accurate, and wear or handling damage has not disrupted the closure dimensions. The process of mechanical Go-No/Go gauging and other inspections can only be performed when tools are taken out of service, and therefore, are not available for production. The frequency of external Go-No/Go gauging and inspection of production line tools is usually performed on a tool based on a period of time, rather than the number of crimping cycles that the tool has experienced. The reason for this is that mechanical crimp tools don't typically have cycle counters, and therefore, the number of cycles on a tool cannot be readily determined. Recent studies have shown that as much as one-third of a crimp tool life cycle is spent in testing and calibration.

The present invention incorporates electronic monitoring of crimp tool operation and provides a method and apparatus for tool inspection that avoids the need for a skilled calibration expert to perform such tool inspection. In particular, the present invention provides an automated inspection apparatus that uses non-contact measuring to gage tool wear and calibration. In one form, the invention also includes a new design of crimp tool system that can be powered pneumatically, hydraulically, or electrically and uses a very low friction, metal-to-metal bottoming design, so that the crimping process is consistent, and long lasting. Common crimping tool designs for 4 axis movement usually incorporates 4 cams and a rotating element in the tool. Wear and high friction are common failings of the four cam tool design. The crimp tool design of the present invention eliminates the use of the rotating element to avoid this source of tool failure.

In addition to the above features, the present invention incorporates a wire guide into a hand-held crimp tool. Historically, only high volume production tools with complex feed systems have wire funnels/guides to help the user get all strands of wire into the wire barrel of a contact or terminal. Further, common hand-held crimp tools require the operator to verify that the correct settings for crimp depth, the correct positioner, and other variables (such as wire size) are correctly managed in a manual system. Weight and size are usually a problem with pneumatic and electric crimp tools where they are intended to be used as portable tools on a wiring harness board, and on second end terminations. Still further, most records that relate to crimping tools are kept, collected, and managed manually. Only very basic records are usually collected and kept on mechanical hand-held crimping tools.

SUMMARY OF THE INVENTION

This invention is a system comprised of a highly efficient Crimp Tool Frame (Platform), accessories including encoded positioners, indenter die assemblies with memory and electronic reporting feature, Wire Funnel mechanism, Iris wire guide and wire diameter verification mechanism, auto-feed cartridge (disposable contact magazines), and a stand-alone indenter die assembly docking station which is used for inspection, verification, and data management of the crimp system. The indenter die assembly and locator have interactive IC chip memory that uses either connected, wireless, or RFID (Radio Frequency Identification) technology to retain digital information and communicate with the database processor. The digital information may include, but is not limited to Identification serial numbers, all crimp cycles (number of cycles under normal crimp pressure), calibration inspections in the docking station, anomalies in crimp pressure or ultrasound signal, operator ID, job traveler numbers, contact part numbers, all configurations and serial numbers of crimping platforms where the indenter die assembly and positioner are installed, and other data that can be retained locally on the chip memory, and/or externally in a system database. The indenter die assembly docking station embodies a process which is totally unique to crimping tools and other crimping systems/machinery. It closes the indenters by use of an electric motor drive (or other mechanical mechanism), and inspects the gauging and surface condition of the indenter tips by computer aided video/path of light inspection. It has interface capabilities to communicate with a central database of crimp die gauging and indenter shape data, as well as keeping inspection records, cycle counts for number of times device has been used under crimp pressure, any anomalies in the crimping process (such as higher than normal crimp pressure, incomplete cycles, etc).

The inventive system also includes a similar Docking Station for Crimping Dies, or crimping tools used for terminals, coaxial terminations, triaxial contact crimping, or other applications. The interface is different, and the cavity for the crimping dies or crimping tools to be installed into the docking station is different, but the function, the technology used, and the interface with a central database are the same.

The Crimp Tool Platform can be cycle controlled by either pressure sensors and/or by ultrasound sensors. If the indenter die assembly is fitted with ultrasound sensors, they will take priority on the control of the cycle. The pressure sensors are located in the crimp arms on the tool, and they will always monitor the performance of the crimp tool platform. The tool will not complete a cycle and open if the normal crimp pressure is not reached. Since the tool is metal to metal bottoming, a more complex pressure sensor attached to the indenter die assembly can sense the actual crimp pressure.

The normal way the smart crimp tool system will be used is manually loading the contact through the front (Indenter die assembly) end of the tool. In one form, the crimp tool platform has a hollow channel through the tool whereby the contact(s) can be fed from the rear of the tool provided a positioning mechanism assumes the function of the positioner. A preloaded cartridge device and an automated feed system can be used with the system for loading contacts. The electronic interface will identify the configuration of the crimp tool, and control/report in a suitable way the crimping function/status of the smart tool crimp system.

The handling of pre-stripped wire is often a cause of failure in crimping systems. Strands can become bent, strands can be left outside the wire barrel, strands can splay and become difficult to get into the wire barrel when manually inserting wire. The smart tool crimp system can be used as a manually fed, manually inserted crimp tool, but there are two optional wire feed/guide systems that may also be used. One such embodiment uses split wire funnels (2 equal pieces). The two pieces will open (separate) when the contact is inserted or removed, but they close to allow the operator to insert the wire through the guide and the bottom of the funnel. The split funnel can be configured to provide a piloted stop for the top of the contact if the contact is fed from the bottom of the tool by the pre-loaded cartridge carrier, or by the automated feed shuttle. The wire funnel may be opened and closed by air cylinders or electric motors. The funnel will become part of the digital identification envelope, and if it is present in the tool, it will identify itself, it's serial ID number, and it will function accordingly by control of the Smart Crimping Tool System central processor. The other automated option for controlling the wire as it enters the contact crimp barrel is an iris assembly (similar to a camera lens aperture adjustment) that opens to allow the contact to open and close, but when the wire enters (sensed electronically), the iris will close until the wire strands are gripped, and held central to the contact wire barrel. A spring mechanism will allow the operator to push the wire toward the contact wire barrel. When the wire enters the wire barrel, the iris mechanism will retract, and allow the wire to be fully inserted into the contact wire barrel. The iris may have a sensitivity knob affixed to the front of the housing to control the sensors that close the iris when a wire is presented. When the iris closes on the wire, it will have the capability of recording the position of rotation, thereby measuring the diameter of the conductor, and making that data available to the central database through the accessory data connector cable/port.

The invention can be briefly characterized by:

1. It eliminates the need for human inspection (Go-No/Go Gauging) by use of the electronic functions of the Indenter Assembly Docking Inspection System (and for tools having crimp dies, or non-removable crimping elements the Die Docking Inspection System).

2. It retains and reports critical data to a central database in real time use.

3. It recognizes what the configuration of each unit is while it is being used.

4. It has options to control the crimp cycle by pressure sensors or ultrasound signature mapping.

5. It adapts to production aids and automation without moving away from the central crimp tool platform or recognizable data management reporting identifiers.

6. Applications requiring special mechanical crimp configurations can be accommodated by the system, because the indenter die assembly is interchangeable, and managed by the database.

7. It creates a permanent record of the exact conditions, configuration, and pressures, etc. of the production crimping process. It eliminates errors and time loss due to manual record keeping. The resulting data can be used for process improvement or investigation purposes.

8. It is plug-and-play. It recognizes the options or specific tooling configuration, and adapts the control accordingly.

9. The crimp configurations and operations can be programmed or changed in software if needed.

10. The low friction design of the Crimp Tool Platform will result in longevity of life, and low maintenance.

11. The system is user friendly.

12. The system has an ergonomic design through the use of lightweight materials (composite plastic molding, etc.).

BRIEF DESCRIPTION OF THE DRAWINGS

For a better understanding of the present invention, reference may be had to the following detailed description taken in conjunction with the accompanying drawings in which:

FIGS. 5A and 5B are cross sectional views of one form of contact positioner for use with the tool of FIG. 1;

FIGS. 6A and 6B are perspective views of a wire guide for use with the crimp tool of FIG. 1.

FIGS. 7A-7E illustrate an iris type of wire guide for use in guiding a wire into mating engagement with a contact to be crimped thereonto;

FIG. 8 illustrates a bench mounted crimp tool in accordance with the present invention;

FIGS. 9A and 9B a data collection and automatic crimp tool calibration apparatus in accordance with one aspect of the present invention;

FIGS. 10A, 10B and 10C illustrate another form of data collection and automatic crimp tool calibration apparatus in accordance with an aspect of the present invention;

DETAILED DESCRIPTION OF THE INVENTION

Figure 1:
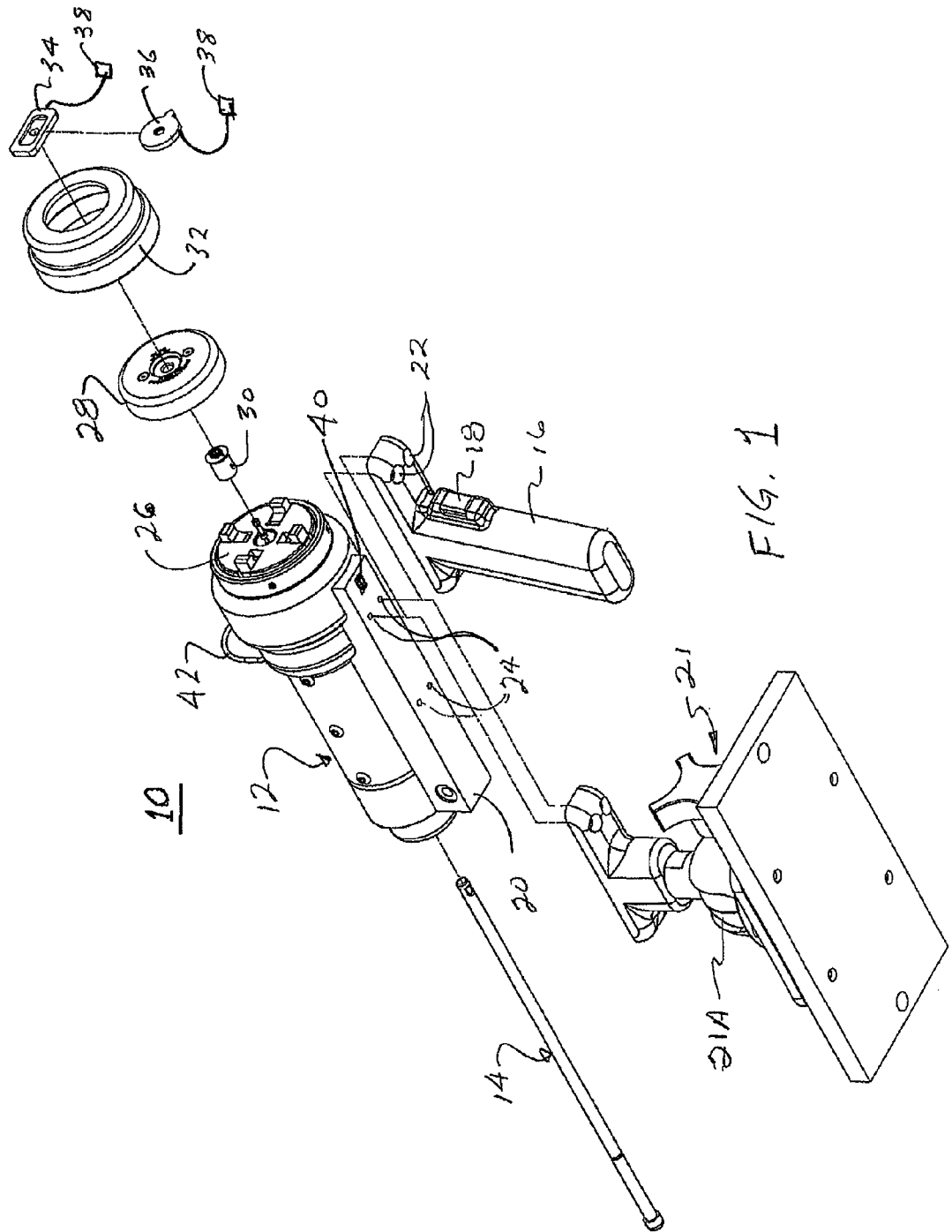
FIG. 1 is an exploded view of a crimp tool incorporating a pressure sensor in accordance with one aspect of the present invention.

Referring now to FIG. 1, there is shown an exploded view of one form of automated crimping tool 10 incorporating some of the features of the present invention. The major part of the tool 10 is a lightweight pneumatic crimp tool platform 12 adapted to receive an auto-feed contact magazine 14 through a rear opening or an individually loaded contact inserted from the forward end of the tool. A contact insertion tool may be used to load single contacts and is described hereinafter. A handle 16 with integral trigger mechanism 18 is removably attachable to the platform 12 via a connector plate 20 fixed to the platform. The handle can be attached using screws (not shown) passing through the handle at 22 and threaded into receptacles 24 in the plate 20. A bench mounted stand 21 can also fasten to the the platform 12 in place of the handle for stationary use. The stand 21 includes a ball joint 21A that allows the tool to be positioned in a convenient orientation for the operator. A four-way crimp or indenter die connector and actuator mechanism 26 seats into a forward end of the platform 12 and a contact crimp die assembly 28 fits over and is actuated by the mechanism 26. In addition, a contact positioner or guide 30 fits into the central opening in the mechanism 26. A retaining ring or cap 32 can be attached using conventional techniques such as a threaded connection or a form of latch operated retainer onto the forward end of the platform to hold the die assembly in place. Wire on which a contact is to be installed is inserted into the forward end of the platform using a wire guide that may be either a wire funnel assembly 34 or an iris assembly 36. The retaining ring 32 is designed to accept either guide and to hold the guide in position. Each of the guides is provided with an electronic power connector 38 that plugs into the platform at 40. The connector 38 is coupled to sensors mounted in the guide that can detect operation of the guide. For example, in the case of the iris assembly 36, a sensor can be provided to count the number of closures of the iris and to measure the aperture size when the iris is closed on a wire to assure that the proper wire size is inserted in the selected contact. One method of determining the size of the iris opening is to use a magnet and Hall sensor arrangement of the type described in U.S. Pat. No. 5,574,502. The platform 12 is also provided with a bail 42 that can be attached to a spring loaded overhead cable (not shown) to help support the tool during portable use.

Figure 2:
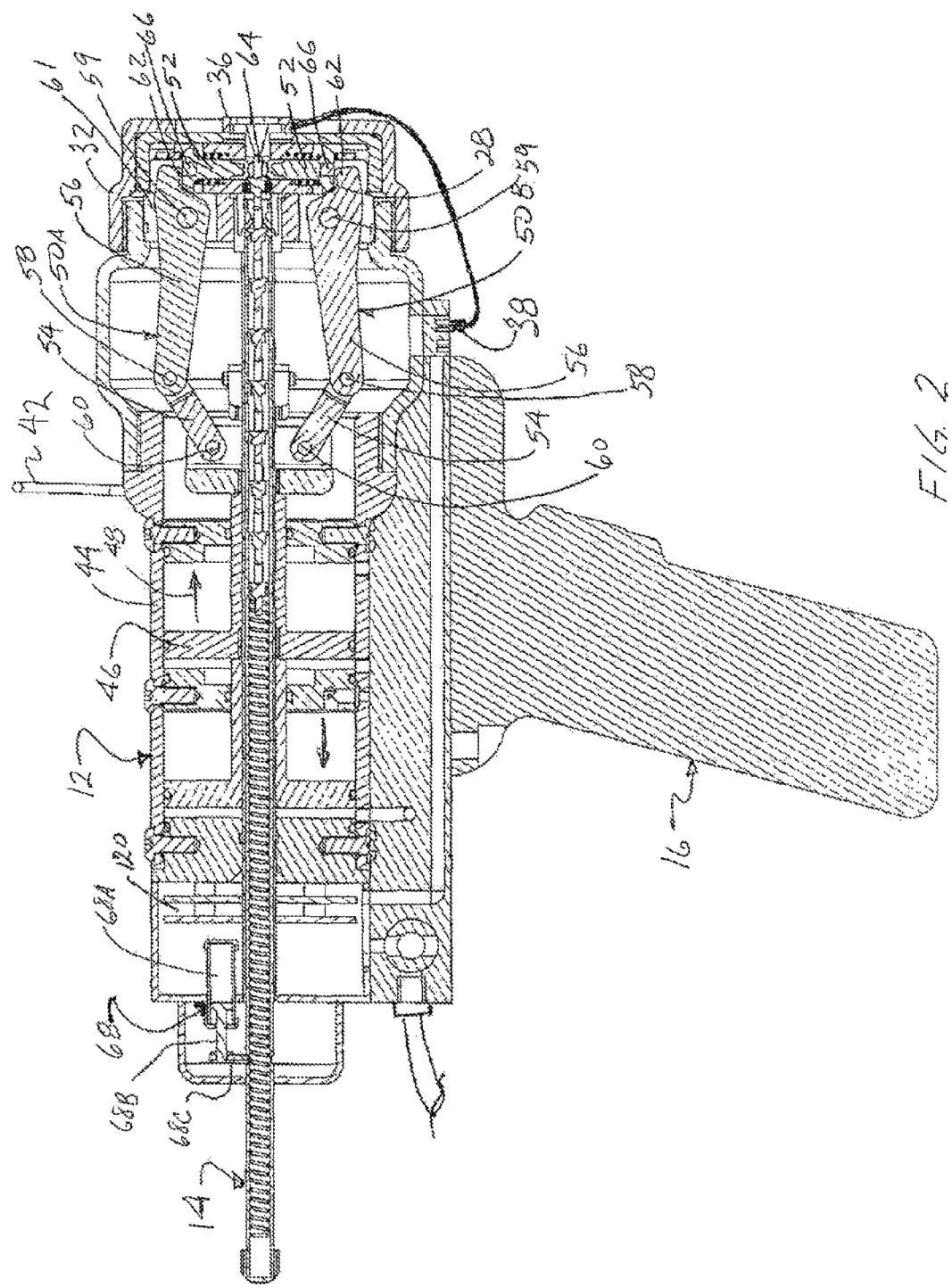
FIG. 2 is a cross-sectional view of the crimp tool of FIG. 1.

Turning to FIG. 2, there is shown a cross-sectional view of the tool 10 with each of the above described elements in assembled position. The platform 12 is essentially a bi-directional double-acting pneumatically operated device mounted in a cylindrical housing 44. A piston 46 is slidingly sealed in the housing such that the piston can be driven in a forward direction as indicated by arrow 48 to actuate a set of toggles 50 in response to actuation of a trigger or other device to allow air pressure to enter the chamber and drive the piston toward the forward end of the tool where the crimp die assembly 28 is seated. In the illustrated embodiment, release of the trigger device switches the air pressure from the rear surface of the piston and directs air to the forward surface to cause the piston to retract to a rest position. As air is applied to the forward surface of the piston, a valve releases the air at the rear surface. Such double acting pneumatic cylinders and their operation are well known in the art and further explanation is not deemed necessary to an understanding of the present invention. The same or similar movement by means of hydraulic pressure or electric motor mechanical drive may also be used.

As will be apparent, although only two toggles 50A and 50B are visible, there are two additional toggles positioned on opposite sides of the axial center line of the housing 44 so that a total of four toggles are used to actuate four crimping anvils or indenters 52 spaced 90 degrees apart around the circumference of the contact crimping die assembly 28. Each of the toggles 50 comprise a short arm 54 and a longer arm 56. Overlapping ends of the arms 54 and 56 are pivotably pinned together at 58. An opposite end of each arm 54 is pivotally attached to the reciprocating piston 46 by a respective one of a plurality of pins at 60. At a location near an opposite end of each of the longer arms 56, the arms 56 are pivotably attached by pins 59 and positioned in slots 61 in the connector mechanism 26. As will be apparent from FIG. 2, as each of the toggle arms 56 pivots . clockwise about a corresponding one of the pins 60, the protruding ends 62 of each toggle arm moves in an inwardly directed motion toward the axial center line of the housing 44 pushing the indenters 52 inward to form a crimp in the contact 64 positioned in the crimp die 28. The clockwise motion of the arm 56 is achieved by advancing the piston 46 toward the indenter end of the tool so that the arms 54 are caused to rotate counterclockwise about their pinned ends at 60 thus pushing the overlapping ends of the arms 54 and 56 in a radially outward direction.

Each of the crimp die indenters 52 are associated with a force sensor 66 that measures the force exerted on the contact 64. The sensors can verify that the correct crimping pressure is being applied to the contacts and metal-to-metal bottoming surfaces, and alert the operator if the indenters have become worn so that pressure has dropped or that a contact is not in the right position when the autofeed magazine 14 is used to feed contacts 64 into the crimping position. While force sensors are known to be used in crimping tools (see, for example, U.S. Pat. Nos. 7,587,918 and 7,024,752), it is not believed that such force sensors have been used in combination with data collection as described in the present application. The contact positioner 30, shown in both FIGS. 1 and 2, seats in the connector assembly 26 and the wire guide or funnel 34 or 36 is captured by the retainer ring 32. The wire guide 34/36 has a harness 38 that connects to the connector at 40. FIG. 2 also shows the contact magazine 14 in position for repetitive feeding of contacts 64 into the crimping die assembly 28. The contacts are advanced in the magazine 14 by a shuttle mechanism 68 comprising a pneumatic cylinder 68A and a piston driven rod 68B to which is attached a finger 68C having an end that rides in a circumferential groove in the side of the magazine. The finger 68C pushes the magazine into the indenter die assembly to cause a contact to be extracted and placed in a crimping position.

Figure 3C:
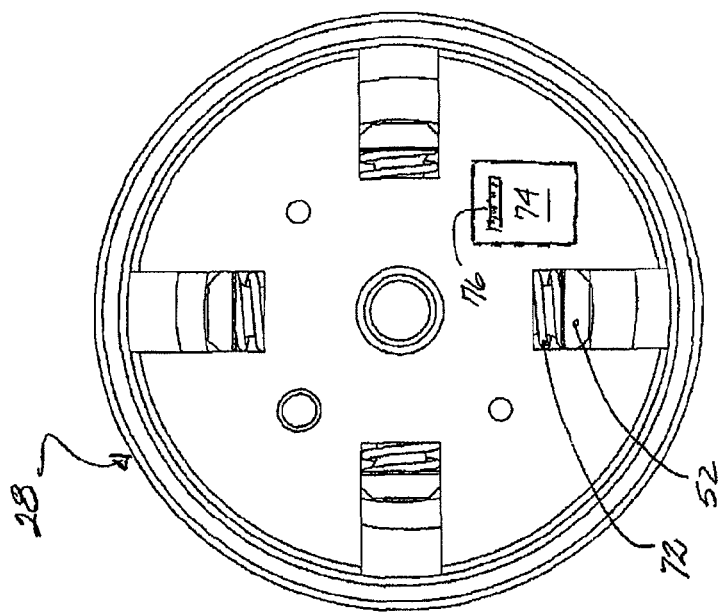
FIGS. 3A, 3B and 3C are rear, cross section and front views, respectively, of an end of the crimp tool of FIG. 1 showing the arrangement of the pressure sensor with respect to the crimp die.
Figure 3B:
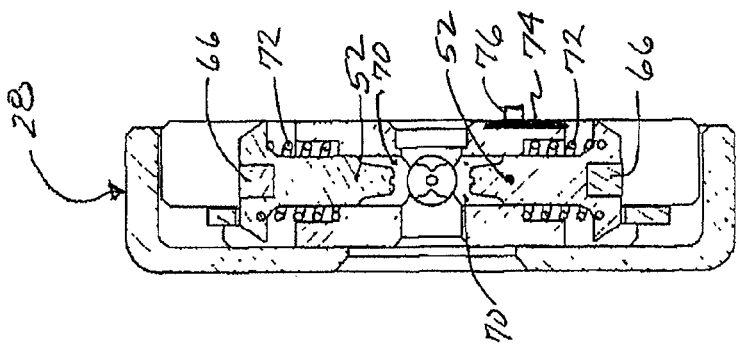
Figure 3A:
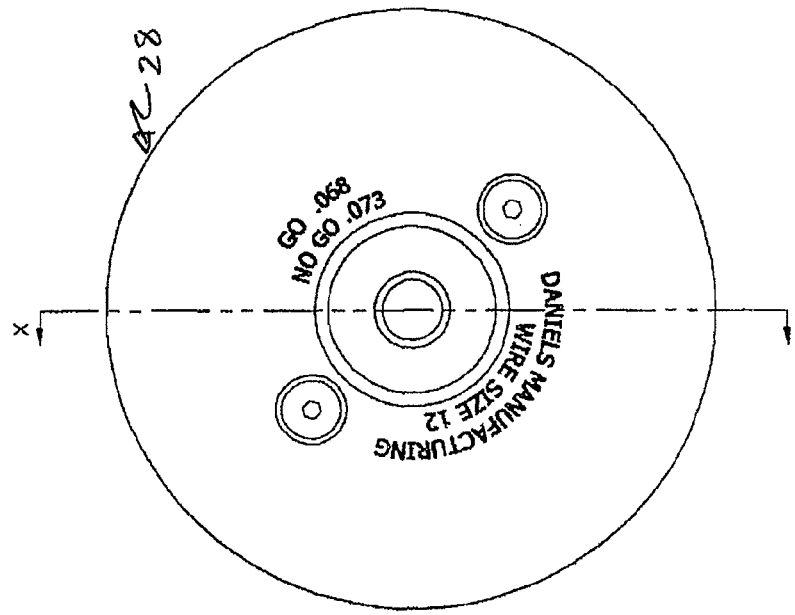

Referring to FIGS. 3A, 3B and 3C, there are shown a front view, a cross-sectional side view and a rear view, respectively, of the indenter die assembly 28. The indenters 52 can be seen to slidably reside in guideways 70 in the assembly 28. Springs 72 are operatively associated with each of the indenters to affect their retractment after crimping of a contact. Electronic processor and memory device 74 is attached to the assembly 28 to transmit data via connector 76 regarding number of cycles and pressure for the indenters. In this respect, data from the force sensors 66 is collected and stored in the device 74 from which the data can then be accessed by an external processor either in the main body of the tool or in a separate unit in which the assembly 28 can be placed for evaluation.

Figure 4:
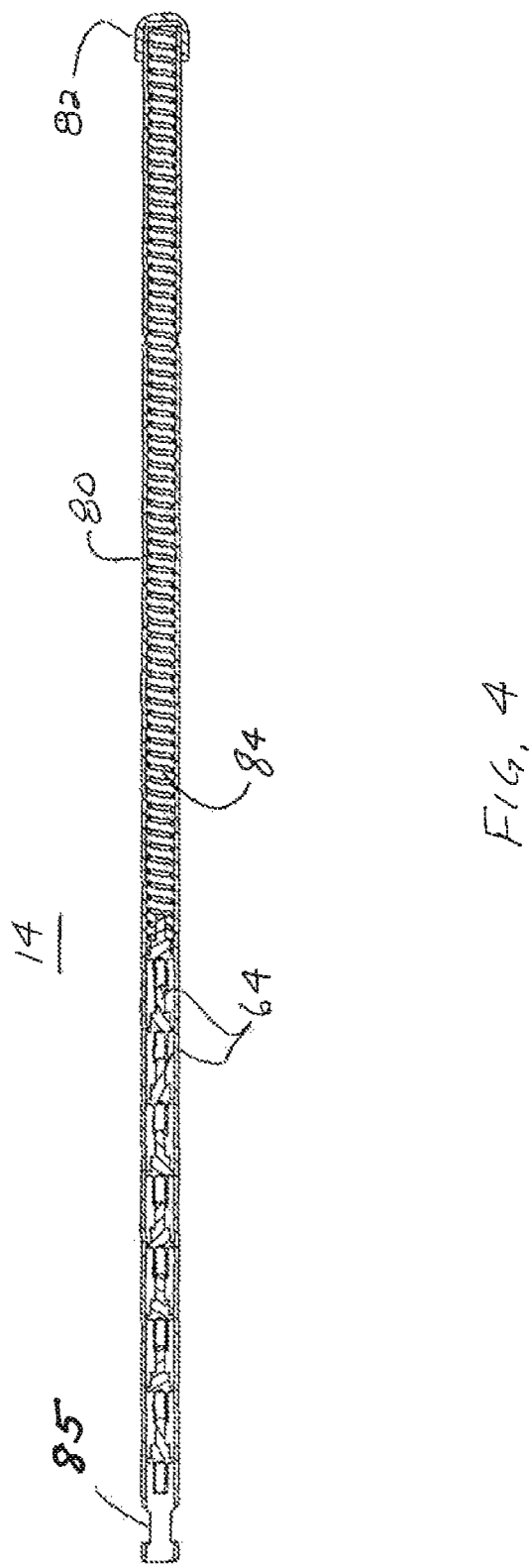
FIG. 4 is a cross sectional view of the auto-feed device shown in FIG. 1 for delivering contacts to the crimp die.

FIG. 4 illustrates one form of auto-feed device 14 that may be used with the present invention. The device 14 is essentially a spring biased tubular magazine into which contacts 64 can be loaded and then dispensed one at a time into the crimping jaws 52. In one form, the magazine comprises a tube 80 with a cap 82 closing one end. An elongated compression spring 84 resides in the tube 80 bearing against the cap 82. Contacts 64 are pressed into an open end of the tube compressing the spring. The contacts are held in place by fingers in the open end of the tube. The fingers are spring-like members pushing radially inward onto the contacts. The shuttle mechanism 68 pushes the magazine into the crimp die assembly 28 to release the spring fingers and allow a contact to exit the magazine into the die assembly. The contacts 64 are stacked into the magazine 14 with spring 84 behind them. The magazine 14 has a diameter (ID) which engages with a molded plastic spring component 85 mounted on the front of the contact magazine. When the contact magazine is pushed forward (approximately ⅛ inch), the diameter on the guide depresses the molded plastic spring component, and it releases the next contact to advance to the crimp position. Each time a contact is crimped and removed from the front of the machine, the small pneumatic cylinder 68 tool reciprocates approximately ⅛ inch. This advances the next contact into the crimp position.

FIGS. 5A and 5B are cross-sectional views of one form of contact positioner 90 that may be used for manual loading of contacts 64 of the auto-loader magazine 14. The positioner 90 is configured to be inserted into the crimp end of the tool 10 and is held in place by the indentor die assembly 28. The positioner comprises a tubular member 92 having an orientation notch 94 formed in a flange 96 which mates into the tool to assure proper alignment of the contact 64. A second tubular member 98 is slidingly positioned in the outer tubular member 92 and is urged toward the flange 96 end by a spring 100. The member 98 is inserted into the member 92 through end 102 prior to closing end 102 with a threaded insert 104. The positioner 90 also incorporates an electronic module 106 that is connected to a set of contacts 108. The module 106 includes a memory that stores information identifying the positioner 90 to assure that the positioner is correct for the particular contacts that are being coupled to a wiring harness. For example, the contact seat 110 is designed to exactly match the contact size to assure correct alignment and positioning of the contact and to assure that the contact matches the size of wire to which the contact is being attached. That information is stored in the memory module 106 and conveyed via contacts 108 to the tool 10 so that the operator is alerted if the contact 64 is improper for the operation being performed. The spring loaded inner member 98 in the positioner compensates for contact growth (extrusion) during crimping. All contacts elongate slightly when crimped, and if the positioner is not spring loaded, the contact has a tendency to bend, and have plating damage.

As described above, an important feature of the present invention is the use of various sensors to monitor operation of the tool along with microprocessor controlled monitoring to read out the sensed variables and provide input to the operator. Referring again to FIG. 2, an electronic circuit assembly 120 is incorporated into the tool 10 for collecting and processing certain data that is input from the various sensors, such as, for example, pressure sensors 66, the memory modules 74 and the iris opening size data from guide 36. For these purposes, the assembly 120 includes a microprocessor and an associated memory module for collecting and storing data. The microprocessor is programmed to compare at least some of the collected sensor data to predetermined data limits and to provide an alarm to the operator if the collected data is outside such data limits. Other data, such as, for example, cycles of operation of the tool may simply be stored for later retrieval, although such cycles may also be set to trigger an alarm or other indication of excess use of the tool. The sensor data is provided to the assembly 120 by conventional wiring embedded in the tool and by connectors such as connector 38.

Turning to FIGS. 6A and 6B, there are shown perspective views of the wire guide 34 in an open and a closed position, respectively. The guide 34 is an electronically controlled unit having a pair of electrically controlled sliding gates 34A that form a conical opening 34B in a closed position. As seen in FIG. 6A, each gate has an extended portion 34C such that the conical opening is in the form of a funnel that serves to guide a wire into one of the contacts 64 shown in FIG. 2. Once the contact is crimped onto the wire, the gates 34A are moved into the open position shown in FIG. 6A to allow the contact and wire to be removed from the tool 10. As discussed previously, the guide 34 includes a memory module that contains information such as the size of the guide funnel so that the tool 10 confirms that the proper size of guide is being used with the particular wire size on which a contact 64 is being crimped.

FIGS. 7A-7E illustrate a preferred form of wire guide for use with the present invention in which the guide 36 comprises an electrically operated iris type of unit. Iris types of guides have been used in other applications to set a particular size of opening such as a light opening for a camera. In this application, the iris 130 is continuously adjustable to any of a range of opening sizes below a mechanical maximum for the particular guide size. The iris 130 may be motor driven and the size determined in the manner described in the aforementioned U.S. Pat. No. 5,574,502. As shown in the figures, a wire end 132 on which a contact 64 is to be crimped initially has a slight spread at its cut end so that the wires are not easily inserted into the opening 134 in the contact 64. The size of the iris 130 in the open position as shown in FIG. 7E is selected to be large enough to insure that the wire end 134 is easily inserted into the iris opening. Once the wire end 132 is inserted into the opening, the iris 130 is closed onto the wire end as shown in FIG. 7B to tightly encompass and compress the wire end so that it can be inserted into the contact opening 134 shown in FIG. 7C. After the wire partially enters the contact wire barrel 134, the iris 130 is opened to allow the wire to be fully inserted into the contact wire barrel 134 for crimping. Although not shown in FIGS. 7D and 7E, the guide 36 has a cable connection 38 to the tool for the electrical control of the guide as shown in FIG. 2. Data regarding the identity of the guide and its operation are also conveyed via connector 38 to the tool 10 or to other data gathering and control electronics associated with the tool 10.

FIG. 8 illustrates another form of bench mount for the tool 10 utilizing an automatic contact feeder mechanism 140 which may utilize a vibratory bowl feeder to orient contacts into a track, or a belt feeder for indexing contacts which are mounted on a preloaded belt or belt-like carrier. The tool 10 is essentially of the form shown in FIG. 2 with the feed magazine 14 replaced by the reciprocating loader 142. In the arrangement of FIG. 8, the loader 142 is driven reciprocally by a motor driven belt 144 connected via a link 146 to the loader 142. The contacts 64 are loaded into the feeder 140 and a feeder track or belt 148 advances the contacts one at a time into the loading position for the loader 142 that then advances a single contact into the tool 10 into position for crimping onto a wire end.

FIGS. 9A and 9B illustrate a data collection and automatic tool calibration (gauging) system that may be used with the present invention by operators with minimal training. The indentor die assembly 28 can be placed in the receptacle 150 in cabinet 152. The receptacle 150 may be designed to accept a number of different sizes of indentor assemblies 28 having a common connector 76 (see FIG. 3C) that will mate with connector 154. This enables the cabinet 152 to communicate with the indentor die assembly 28 so as to identify the particular indentor die assembly by exact type and serial number. A processor in the cabinet 152 can then use the data from the indentor die assembly to determine its history and to set parameters for evaluation and/or calibration. Evaluation of indentor die assembly 28 involves measurement of the space between the ends of the indentors 52 (see FIG. 3C) when the indentors are in a closed position and may also include a measurement of the force required to close the indentors. Some versions of this device may use a video inspection system to also inspect the crimping surfaces for damage, wear, or debris. Where this is utilized, digital photographic files can become part of the permanent database records. In order to automate this function, the present invention uses a collimated light source, such as a laser diode array, mounted in the cabinet 152 below a central aperture 156 to project an image of the indentors 52 onto a light sensor 158. Measurement of the size and/or shape of the indentors is obtained from the pixel data recorded by the sensor 158. Techniques of obtaining such data from a light sensor are known in the art. See, for example, a discussion of size measurement in U.S. Pat. No. 4,974,164. Based on the results of the automated evaluation, the indentor assembly can be approved for further use or taken out of service. It will be noted that the cabinet 152 includes a data readout display 160 as well as several function select buttons 162 that allows the operator to see the results of the evaluation.

Figure 10A:
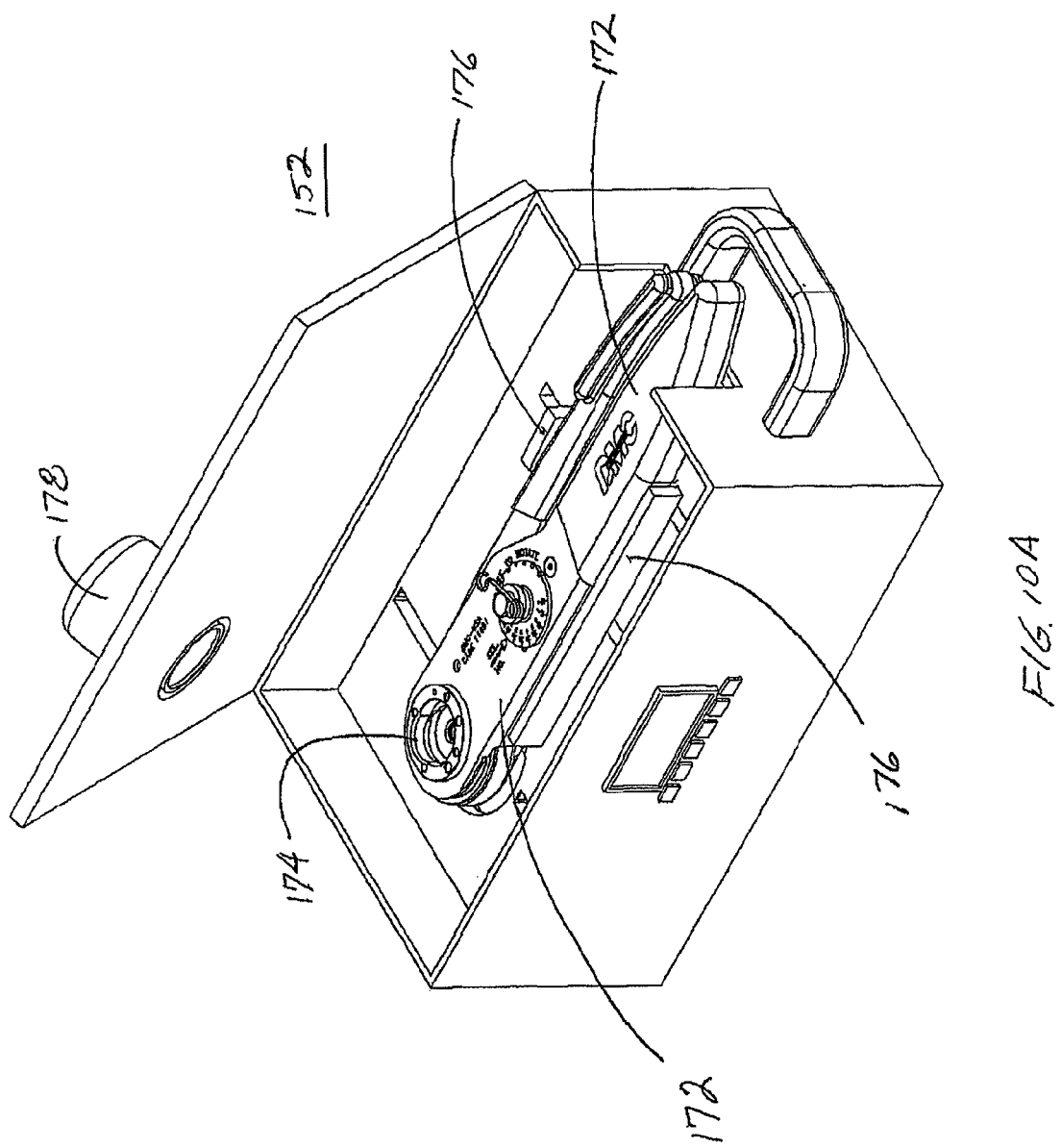
Figure 10C:
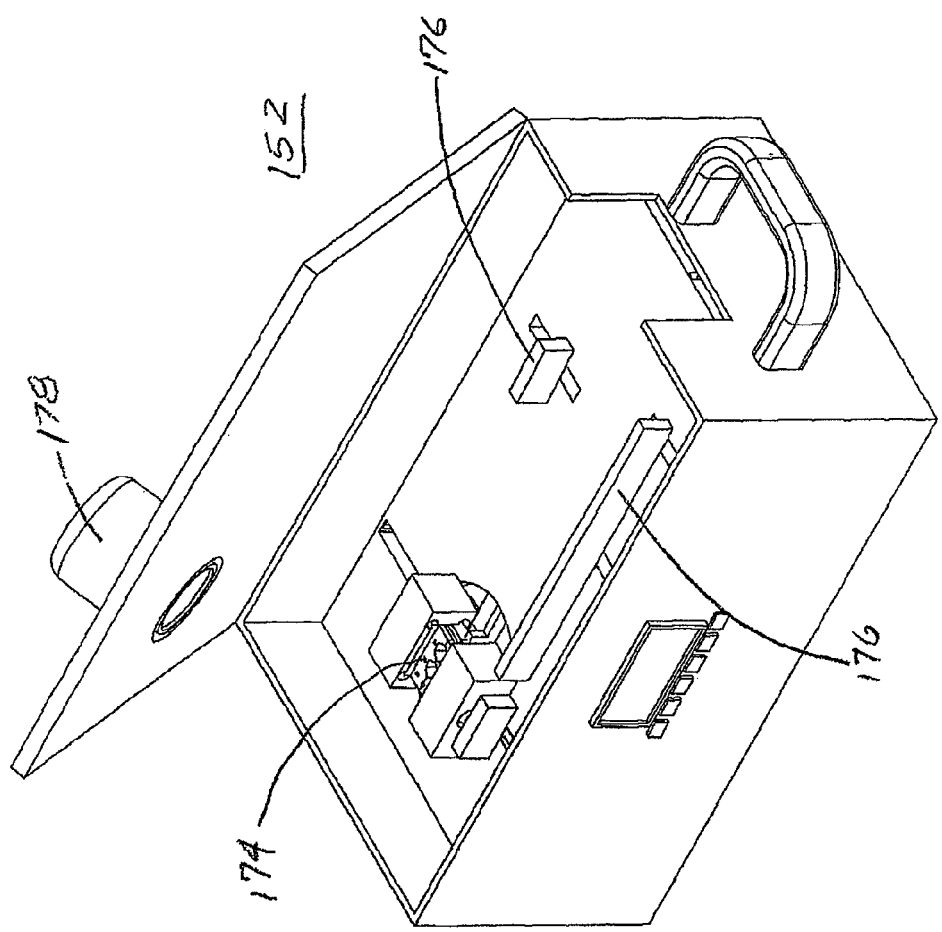

A further modification of the cabinet 152 is shown in FIGS. 10A, 10B and 10C in which another cabinet 170 is adapted to receive a manual crimp tool 172 having an integral indentor assembly 174. The cabinet 170 includes a plurality of guides or holders 176 that properly orient the tool 172 for evaluation of the indentor assembly. In other respects, the cabinet 170 includes the same features as cabinet 152, i.e., a light projector projects light through the indentor assembly onto a light sensor 178 that records the size and shape of the opening through the indentors and the configuration of the ends of the indentors. FIG. 10A shows how an entire hand tool can be placed in the gauging cabinet while FIG. 10C shows only the indentor assembly 174 placed in a gauging arrangement. FIG. 10B illustrates the gauging apparatus with the indentor assembly 174 in spaced positioned for insertion. Based on the results of the above measurements, the tool can be approved for use or sent to a facility for rebuilding or replacement.

Figure 11:
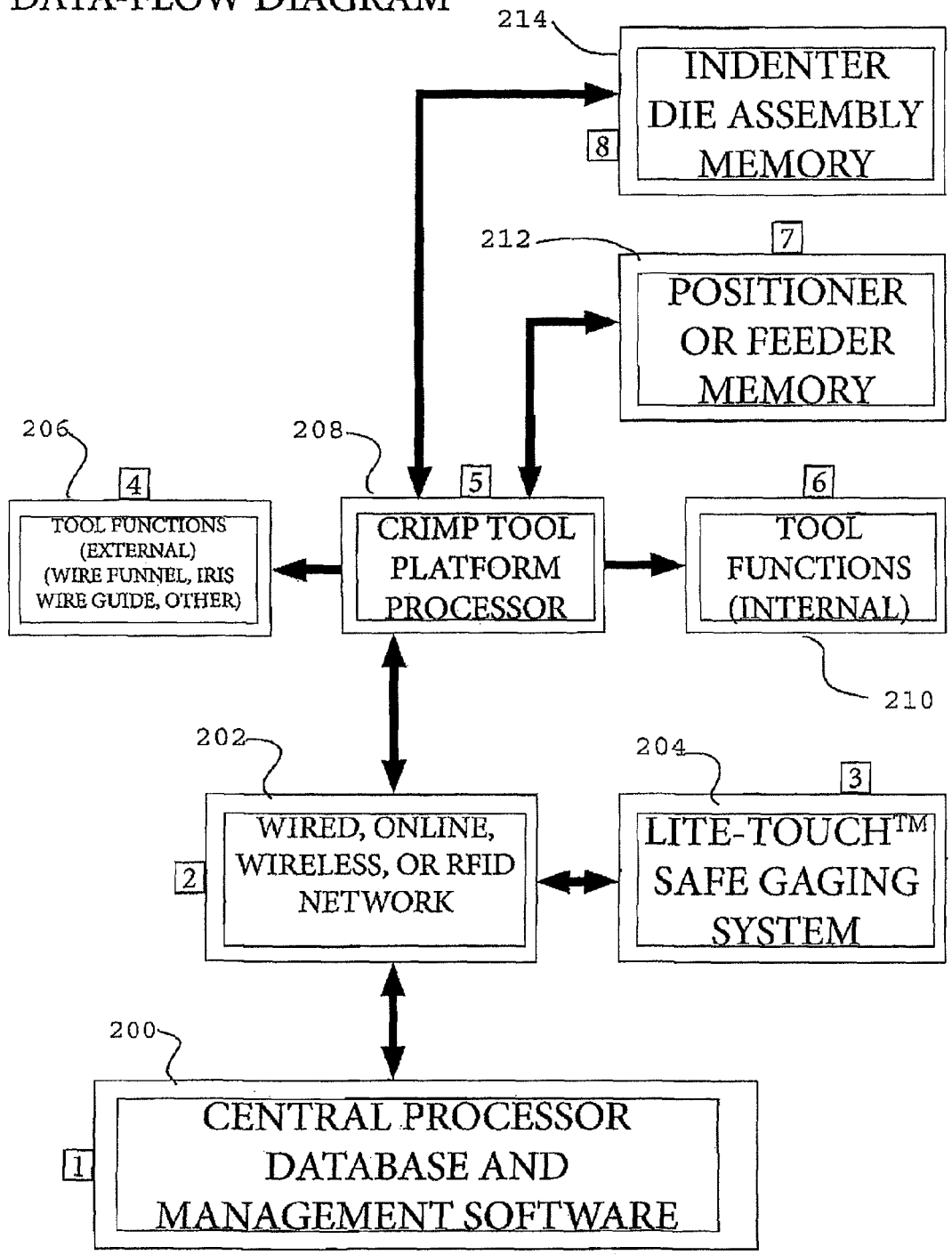
FIG. 11 is a flow chart illustrating a crimp tool calibration and monitor process in accordance with another aspect of the present invention.

Referring to FIG. 11, there is shown a simplified flow diagram for the data collected and processed by the various sensors incorporated in the present invention. Block 200 represents the central database associated with the various crimp tools that may be used in a particular environment and is configured to confirm the data received from the crimp tools as they are used, calibration data from the Crimp Tool Gauging System represented by cabinets 152 and 170, and memory data which is accumulated during the use of the crimping system. The data is stored and archived in the cabinet processor for future retrieval and analysis. The software is configured to confirm the configuration of the crimper to the application, and to generate reports and search fields as management tools.

Block 202 represents the communication network within the tools and between the tools and the central processor in the calibration cabinets 152 and 170. The network includes wireless and wired communication and may used radio frequency identification between the tool and its various components, such as the indentor assembly, rather than a hard-wired connection. Block 204 represents the gauging system incorporated into the cabinets 152, 170, including the collimated light and light sensor and the associated data processing system that extracts real time measurements from the light sensor to provide automatic measurement and inspection of tool crimping surfaces and the die assemblies used in production applications of crimp tools. Block 206 represents the mechanical functions of the tool including wire funnel using either the guide 34 or guide 36. As mentioned, movement of these components is achieved by small electric servo motors. The on/off function of the motors and the read-only data collection functions are accomplished through an electrical cable/connector 38 on the tool and then communicated from/to the crimp tool platform processor.

Block 208 represents the crimp tool platform processor and related circuits (including circuit 120) in the crimp tool platform that controls the internal functions of the tool (such as the air valve network, the contact cartridge shuttle actuator, pressure sensor processing management, and other functions of the tool. The crimp tool platform processor can also interacts with data controls from an external central processor and ultrasound sensors as needed to control the operation of the tool. Block 210 represents the electrical valves and other controllable components of the tool that are monitored and controlled by the circuit 120. Block 212 represents additional features that are used in the present invention, including the identification features via electronic sensor that are incorporated into the wire/contact positioner, the contact cartridge and guide, and the automated feeder/guide. While electronic memory is preferred, it is also possible to use bar code reader to Identify the different components of the system. Block 214 represents the indenter-die assembly memory, preferably a programmable memory which will store its part number, capital equipment number, gauging date/time, number of crimp cycles, pressure, ultrasound sensor data (if used), and other data. In the illustrated embodiment, the data is communicated to the crimp tool platform processor through a hard-wired electrical connector 38 that mates when the die is installed into the tool or into one of the calibration cabinets ("docking station") 152,170.

The elements or segments of a Crimping Tool or Crimping Die that are shaped and configured to re-form a wire and wire barrel into an acceptable crimp termination for use in an electrical/electronic system must be checked periodically with some form of measurement device. These elements or segments move to a precise closure when the tool is manipulated through a complete cycle. Since the tolerances are typically very small, a set of hardened pins (round, rectangular, or another designated shape) are often used. The set of hardened, durable steel pins (usually two pins per crimp cavity) are identified as a GO-NO/GO Gage, with the smallest of the two pins being the "GO" Gage, and the largest of the two pins being referred to as the NO/GO Gage.

The use of GO-NO/GO Gages requires an experienced and trustworthy technician with an understanding that damage can occur when hardened gage pins are inserted into crimp tools and crimp dies. If, for-instance the tool is not fully closed, and the NO/GO gage is present in the crimp cavity when the tool or die reaches full closure, it will damage the crimp tool, die, and gage. Also forcing gages into crimp cavities, using incorrect gages, using rectangular gages in the wrong orientation, or other inappropriate use of hardened steel gages can cause damage, premature life cycle, or inaccurate inspection reporting which can lead to the use of tools which should be removed from production.

The Use of Light and Video to Gage Crimp Tools and Crimp Dies will eliminate the requirement for inserting hardened GO/NO-GO Gages into Crimp tools and Crimp Dies. Therefore, accurate measurements can be made without the need for experienced technicians, and the possibility of damage or inaccurate measurements. Such a light and video system uses a combination of a light source, a video receiver, and software which can access a database of configuration data for crimp tools and crimp dies. Fixtures are used to hold crimp tools and crimp dies into a measurable position and a computer based video receiver will be provided to make the measurement of crimp tools and crimp dies user friendly.

A basic light source and video receiver incorporating a computer system for dimensional measurements is available from Keyence Corporation of Osaka, Japan under their designation IM-6500 Series. This apparatus provides a system for high-precision automatic measurement using image processing technology. The IM-6500 Series incorporates a computer system with a database that can be used to store dimensional information for any tool or other object that is to be measured. In the present invention, a plurality of fixtures are designed for attachment to the base of the of the apparatus so each of a plurality of different crimp tools or die sets may be positioned so as to be dimensionally measured by the apparatus. The computer database is programmed with the desired dimensions of the various tools and dies so that the operator can select the particular tool/die from a menu and the apparatus will automatically provide dimensional measurement of the tool or die. All significant features of the elements or segments of a crimp tool or crimp die which are intentionally shaped and configured to perform a crimp termination can be loaded into the database in the form of dimensions, shape, configuration, condition (cracking or bending) and similar features that can be inspected by a combination of light and video. The user interface for the apparatus has a selection screen and is programmed to prompt users through the crimp tool or crimp die measurement process using a selection device such as a keyboard or pointer. Preferably, the system includes a user log-in so that measurements can be traced to a particular user of the apparatus.

In one form, the apparatus may be combined with a magnetic or bar code or serial number reader so that the apparatus can be programmed to identify a tool or die by its unique part number, serial number, or other user loaded number. This recognition process may be done from bar code scanners, user input from a keyboard, RFID interface, or a connection to imbedded memory within the tool or die assembly. When imbedded memory or a digital processor is recognized, the software can be programmed to recognize and store cycle count information, wear indication data, sensor condition data, system diagnostics, and other data which can be used to recognize whether the crimp tool or crimp die is suitable for return to production. By associating each tool or die with a unique identifier, the apparatus can be programmed to recognize the unit under test, and locate the necessary records to perform inspection, and record the results in a database.

If the unit under test does not identify itself automatically because of the design of the part, e.g., no embedded electronics, the part number and other needed information may be loaded manually by the operator.

The fixturing components are configured to grip and hold the crimp tool or die in the fully extended or closed position for gaging. In cases where a depth selector (knob, screw, or latching mechanism) is required to be in a certain position for gaging, the operator will be prompted by instructions which appear on the apparatus screen or video display.

Figure 12:
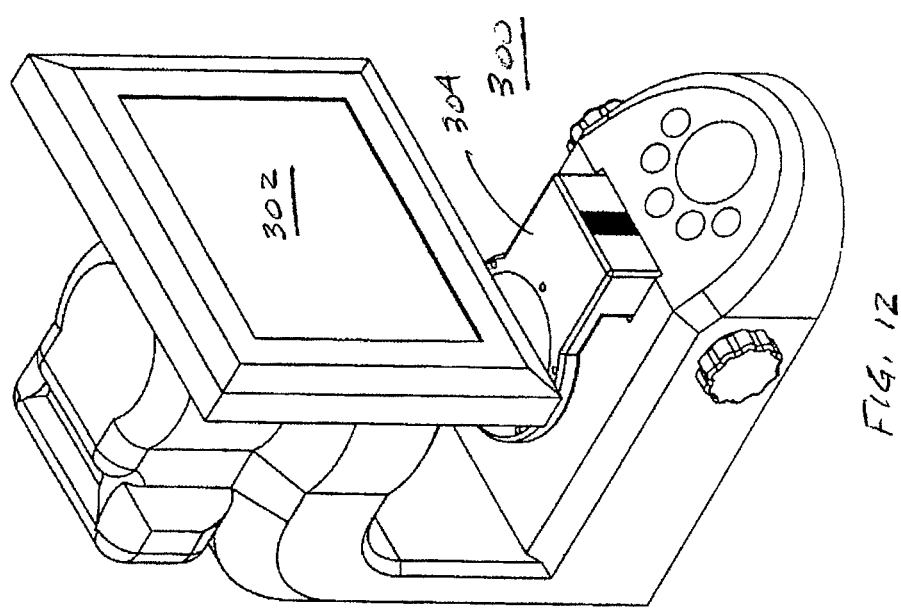
FIG. 12 illustrates a commercial measurement tool that can be used in implementing the process of FIG. 11.
Figure 13:
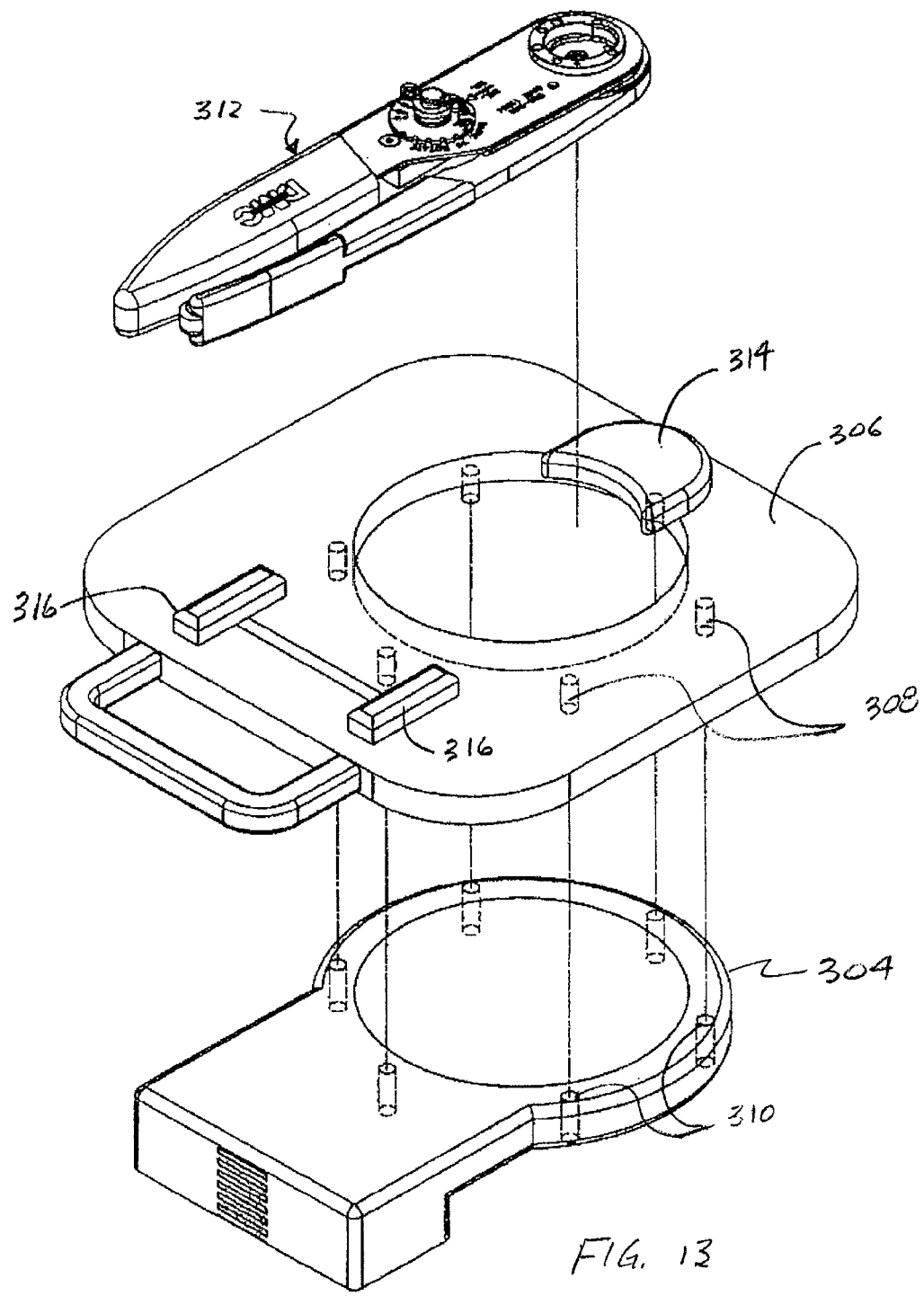
FIG. 13 illustrates one form of fixture adapted for use with the tool of FIG. 12 to enable measurement of crimp tools.

FIG. 12 is a simplified image of a Keyence IM-6500 Series measurement apparatus 300 that may be used with the present invention. A detailed description of the apparatus 300 may be had by reference to the Keyence Corporation web site at www.keyence.com. In general, the apparatus 300 includes a video screen 302 for displaying measurement data and for setting up the apparatus for measurements and a lower platform 304 on which a tool or die (not shown) is placed for measurement. Referring to FIG. 13, one form of tool mounting fixture 306 is shown juxtaposed with the platform 304. Various pins 308 are used to situated fixture 306 onto platform 304 by insertion of the pins into mating holes 310. An exemplary crimp tool 312 is shown positioned for alignment onto the fixture 306. In this embodiment, the tool 312 is aligned for measurement using the front nose bracket 314 and the pair of rear side brackets 316. A handle 318 is attached to the fixture 306 for ease of transport and handling.

Figure 14:
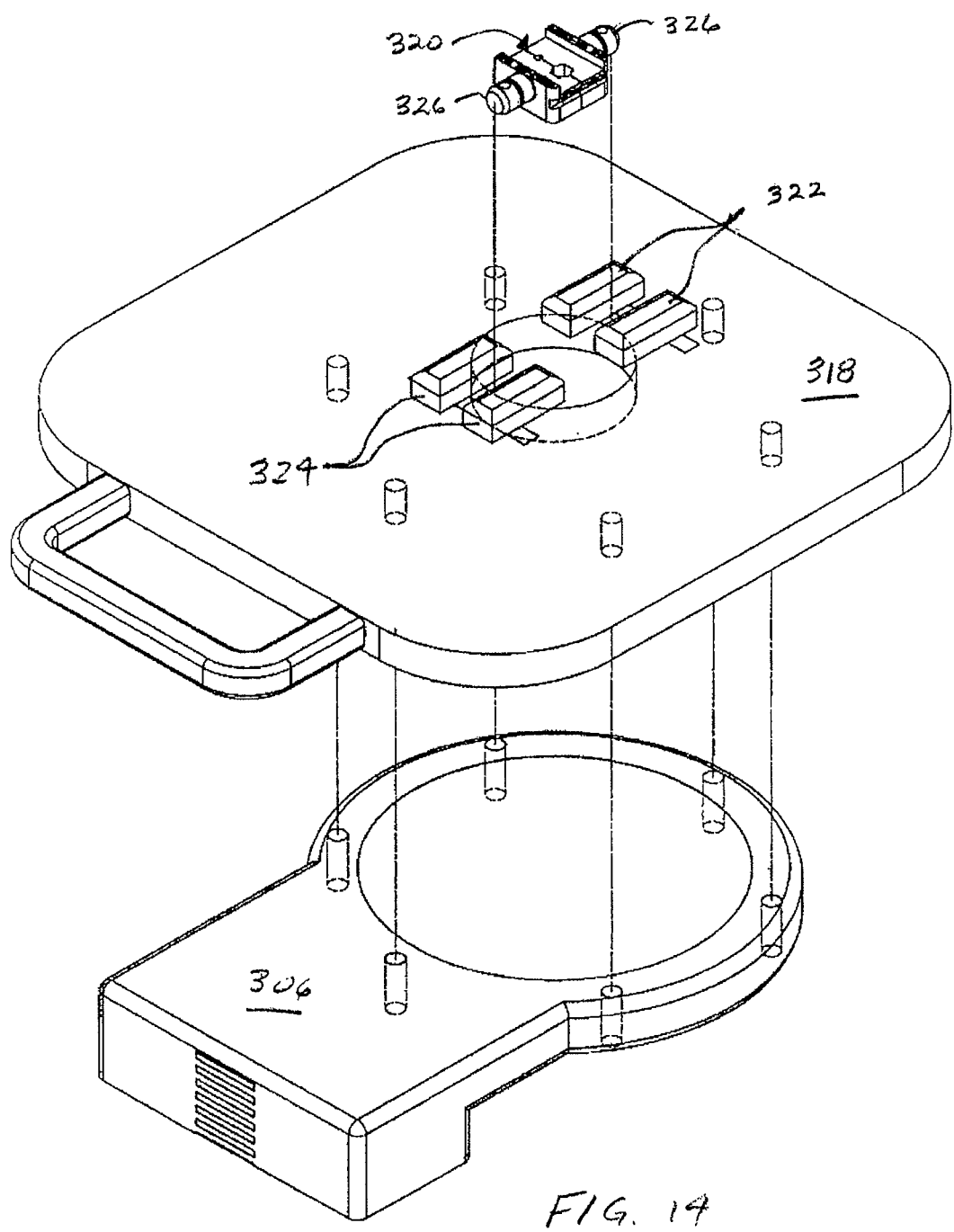
FIG. 14 illustrates a form of fixture adapted for use with the tool of FIG. 12 to enable measurement of crimp dies.

FIG. 14 illustrates another form of fixture 318 for attachment to platform 304. The fixture 318 aligns to the platform in the same manner as fixture 306 but is configured to accept only a crimping die 320 rather than the complete crimp tool 312. The die 320 is aligned for measurement by use of two sets of mounting brackets 322 and 324, each of the brackets comprising a pair of supports that are configured to mate with die mounts 326.

The invention claimed is:

1. An inspection system for gauging of an indentor mechanism used for crimping contacts onto a wire cable end comprising:
   apparatus for positioning the indentor mechanism in a predetermined orientation;
   a light source for projecting a light beam through the indentor mechanism;
   a light sensor panel for detecting an image of the indentor mechanism resulting from projection of the light beam therethrough; and
   apparatus for comparing the dimensions of selected elements in the indentor mechanism to predetermined dimensions of an acceptable configuration of the selected elements for gauging the condition of the elements.

2. A system for automated inspection of a crimping die used in a crimping tool for crimping contacts onto a wire cable end comprising:
   an inspection system having a light projector and a light sensor adapted for detecting a precise pattern of light projected through a crimping die and for providing precise measure of dimensions and configurations of the crimping die;
   a computer database associated with the inspection system for storing data representative of desired measurements of the crimping die;
   a computer system operatively coupled to the inspection system and the computer database and programmed to compare measurements from the inspection system with the desired measurements from the database and for providing a visual indication of the fit of the measured dimensions and configuration of the crimping die to the stored desired measurements; and
   a set of fixtures adapted for use with the inspection system for positioning the crimping die in a predetermined location and orientation in the inspection system.

* * * * *